United States Patent [19]
Meyerle et al.

[11] 4,382,392
[45] May 10, 1983

[54] HYDROMECHANICAL TRANSMISSION WITH POWER BRANCHING

[75] Inventors: Michael Meyerle, Meckenbeuren-Lochbrücke; Gisbert Lechner, Böblingen; Anton Ott, Tettnang, all of Fed. Rep. of Germany

[73] Assignee: Zahnradfabrik Friedrichshafen AG, Friedrichshafen, Fed. Rep. of Germany

[21] Appl. No.: 896,501

[22] Filed: Apr. 17, 1978

[30] Foreign Application Priority Data

Apr. 16, 1977 [DE] Fed. Rep. of Germany ....... 2716960

[51] Int. Cl.³ .................. F16H 47/04; F16H 37/06
[52] U.S. Cl. ......................................... 74/687; 74/682
[58] Field of Search ........................... 74/682, 687

[56] References Cited

U.S. PATENT DOCUMENTS

| | | | |
|---|---|---|---|
| 3,055,233 | 9/1962 | Giles | 74/687 |
| 3,143,898 | 8/1964 | Evernden | 74/682 X |
| 3,371,555 | 3/1968 | Tuck et al. | 74/677 |
| 3,433,094 | 3/1969 | Phillips | 74/682 |
| 3,433,095 | 3/1969 | Tuck | 74/687 |
| 3,470,769 | 10/1969 | Livezey | 74/687 X |
| 3,596,535 | 8/1971 | Polak | 74/687 X |
| 3,626,787 | 12/1971 | Singer | 74/687 |
| 3,641,843 | 2/1972 | Lemmens | 74/751 |
| 3,665,788 | 5/1972 | Nyman | 74/687 |
| 3,675,507 | 7/1972 | Takekawa | 74/687 |
| 3,714,845 | 2/1973 | Mooney, Jr. | 74/687 |
| 3,783,711 | 1/1974 | Orshansky, Jr. | 74/687 |
| 3,969,957 | 7/1976 | De Lalio | 74/687 |

FOREIGN PATENT DOCUMENTS

| | | |
|---|---|---|
| 1188958 | 3/1965 | Fed. Rep. of Germany . |
| 1775755 | 9/1971 | Fed. Rep. of Germany . |
| 2140292 | 5/1973 | Fed. Rep. of Germany . |
| 1817764 | 11/1973 | Fed. Rep. of Germany . |
| 2415002 | 10/1974 | Fed. Rep. of Germany . |
| 2446801 | 4/1976 | Fed. Rep. of Germany ........ 74/687 |
| 1535096 | 6/1968 | France . |
| 1454702 | 11/1976 | United Kingdom . |

OTHER PUBLICATIONS

"Characteristics of Multiple Range Hydromechanical Transmissions", Eli Orsharsky et al., Sep. 11–14, 1972, SAE.

"Leistungsverzweigung bei der Stufenlosen Drehzahlregelung et al.", Gunter Gackstetter, VDI-2, 108/1966/No. 6, Feb. [III].

"Überlagerungsantriebe", Jean Thoma, 15 [1971], No. 3.

*Primary Examiner*—Leslie Braun
*Attorney, Agent, or Firm*—Karl F. Ross

[57] ABSTRACT

This invention is for a hydrostatic-mechanical transmission system of the power-branching type having a "neutral" operating mode. An assembly of a hydrostatic transmission including a variable displacement pump and a hydraulic motor is connected to the input shaft of a mechanical transmission. The mechanical transmission has a speed-range selector defining a first low-speed range for the gearing and a second high-speed range for the gearing. Two planetary gear sets in succession are coupled to the transmission such that the transmission ratios of the hydrostatic transmission and the mechanical transmission establish a neutral mode in each speed range a zero output contribution by the mechanical transmission.

2 Claims, 10 Drawing Figures

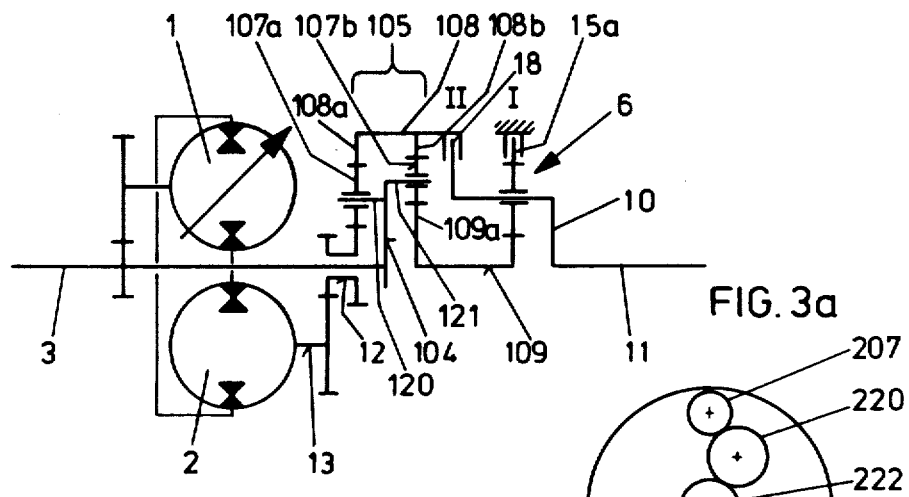
FIG. 2
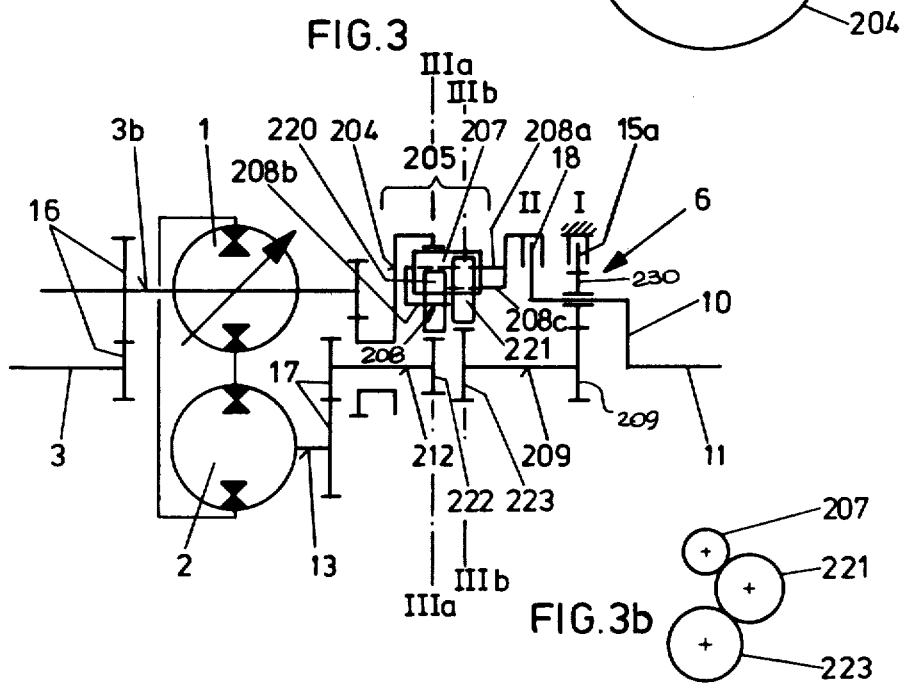
FIG. 3
FIG. 3a
FIG. 3b

HYDROMECHANICAL TRANSMISSION WITH POWER BRANCHING

FIELD OF THE INVENTION

The invention relates to a hydrostatic-mechanical transmission with power branching.

BACKGROUND OF THE INVENTION

Known hydrostatic-mechanical transmissions with power branching can comprise two hydrostatic machines constituting hydrostatic transmissions and a mechanical transmission, whereby the transmission input shaft is connected with the hydrostatic transmission as well as with the mechanical transmission and the mechanical transmission is connected with a summing unit for summing the power figure delivered via the drive shaft and via the hydrostatic transmission.

The invention is based upon a state of the art which is found, for example, in the transmission system of the German Pat. Nos. 1,817,764 and 1,188,958. These transmission systems have the disadvantage that their power/weight and power/volume ratios are excessive and thus are too costly. Apart from this, excessive noise, unsatisfactory shifting shocks and high starting resistances (break-loose torques of the hydraulic motor) arise.

OBJECTS OF THE INVENTION

It is thus an object of the invention to obviate these disadvantages and to optimize not only the environmental characteristics but also the energy consumption of the system.

Another object is to provide an improved hydrostatic-mechanical transmission affording a maximum increase in the transmission inflection characteristics (i.e. the product of maximum output torque and maximum output speed) by comparison to a simple hydrostatic transmission and to optimize different economic factors such as the power/weight and power/volume ratios in such a system.

Still another object is to provide a transmission with a main working range functioning with minimum hydraulic power and nevertheless with optimum efficiency and good durability.

It is also an object to provide a transmission in which intrinsic starting resistance, which in the known transmission systems resides in the break-loose resistance (break-away torque) of the hydromotor, is avoided, thereby ensuring increased vehicle-starting force a jerkless start.

An additional object is to provide a transmission which minimizes shifting shocks.

SUMMARY OF THE INVENTION

In the obtaining of these objects a steplessly controllable hydrostatic power branching transmission is obtained which is effective over the total speed range and which has the economic advantages required of the more demanding street-traffic vehicles as well as an optimum system for the recovery and storage of braking and, possibly, surplus energy.

These objects are attained by providing a transmission of the type described wherein ratios of the mechanical and hydrostatic transmission are so selected that in the first drive range (crest speed) in the "neutral" position, no output revolutions are contribued by the hydrostatic transmission to the summing transmission.

Advantageously the mechanical transmission has two planetary-gear sets with a transmission input shaft. The hydrostatic transmission as well as the planet carriers or hollow wheel of the first planetary transmission unit directly or via one or more gear stages, is driven. The output of the hydrostatic transmission with a preferably constant displacement is connected with the sun gear of the first planet set directly or via gear stages, whereby via the plant gears of the first planet set the hydraulic power is summed with the mechanical power in the planetary transmission and in common via the sun gear of the second planet set in first speed I or is connected via the hollow gear or the planet carrier of the first planet set in the transition range is connected to the output.

The two cascaded planet transmissions can have the following constructions:
first planetary transmission:
two-stage planetary transmission formed as a summing transmission for the speeds of the transmission drive shaft and the output shaft of the hydrostatic transmission whereby the mechanical transmission acts upon members or the hollow gear and the hydrostatic transmission acts on the inner central gear and the output in first speed is effected over the inner central gear and in the second speed range via the hollow gear or the member.
second planetary gear transmission:
single-stage planetary transmission as a superimposing transmission in the first vehicle speed range for the speed derived from the first planet set whereby the inner central gear is driven and/the output is connected with the planet carrier and in the second speed range no speed change is effected.

Recovery of the braking energy and its storage, is obtained with the invention in that the transmission is provided with a device for the recovery and storage of the braking energy comprising a flywheel connected with a free wheeler and with the inner central gear of a superposed planet transmission whereby the outer central gear thereof is connected with the output shaft of the drive engine and the planet carrier is connected with the transmission drive shaft. This is the same whether the braking energy storage flywheel is arranged vertically or parallel to the transmission longitudinal axis.

BRIEF DESCRIPTION OF THE DRAWING

FIG. 2 is a view similar to FIG. 1 of the embodiment of a hydrostatic-mechanical transmission but with a modified gear- and speed-change arrangement but the same characteristic curves;

FIG. 3 is another similar view of a further embodiment of a hydrostatic-mechanical transmission but also with corresponding characteristic curves;

FIGS. 3a and 3b are sections along the lines IIIa—IIIa and IIIb—IIIb of FIG. 3, respectively;

SPECIFIC DESCRIPTION

Figure 1:
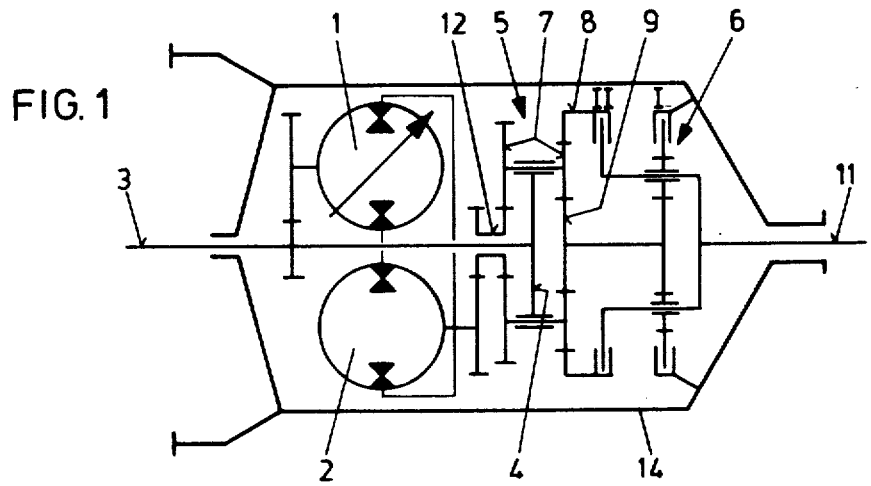
FIG. 1 is a diagrammatic section through an embodiment of a hydrostatic-mechanical transmission with power branching and without storage for the braking energy.

FIG. 1 shows the housing 14 of a hydrostatic mechanical transmission having an input shaft 3 of the transmission, a transmission output shaft 11, two hydrostatic units 1 and 2 and two planetary transmissions 5 and 6 successively connected to the hydrostatic units. The hydrostatic units comprise a variable displacement pump 1 and a fixed displacement motor 2. The transmission-drive shaft input shaft 3 comprises a throughgoing shaft stem 3a (FIG. 1a) which drives the planet carrier 4 of the first planetary gear transmission 5 as well as a branched shaft 3b connected to the actuation shaft through a two-gear stage 16 and driving the variable displacement pump 1.

The sun gear 12 of the two-stage planetary transmission 5 is connected via a gear stage 17 (FIG. 1a) with the output shaft 13 of the constant displacement motor 2. The second planetary gear transmission 6 is of the single-stage type and has its sun gear 9, formed as a double gear, meshing with the planet gears 7 of the planet carrier 4 and with planet gears 30 of a carrier 10; the latter can be coupled via a clutch 18 to the ring gear 8 of the first planet gear set 5. The ring gear 15, with which the planets 30 mesh, can be stopped by a brake 15a. The output of the second planetary gear transmission (taken from the planet carrier 10) is delivered to an axle drive (not shown) via the transmission output shaft 11. The drive of the transmission is effected by an engine not shown which is connected with the transmission input shaft 3.

Figure 1A:
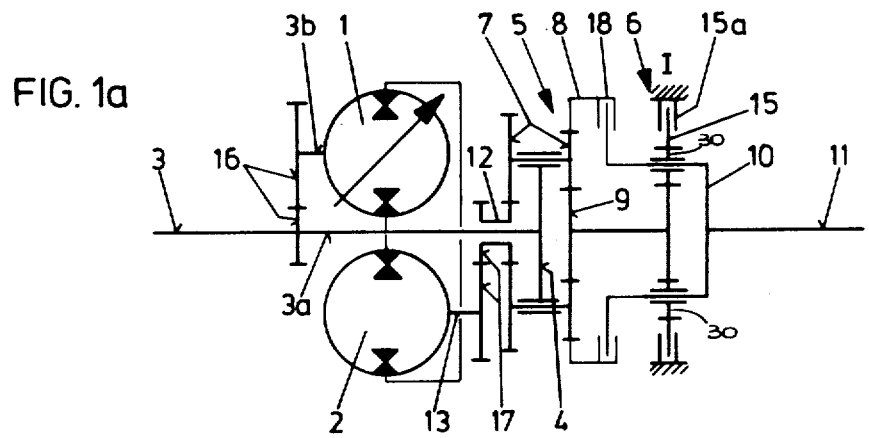
FIG. 1a is a diagram of the power flow for the transmission of FIG. 1 for the driving range I.

FIG. 1a shows the power flow during driving in the mechanical transmission range I by illustrating the participarting gear sets with heavier lines.

The brake 15a is closed in drive range I. The transmission input shaft 3 is, as already mentioned, connected with the planet carrier 4 of the first planet carrier 5 by the shaft 3a. The output shaft 13 of the constant displacement motor 2 acts through the gear 7 stage 17 upon the planetary gears of the planet carrier 4. The power transmitted through the planet carrier 4 and via the gear stage 17 reaches the sun wheel 9 and is transmitted through the second planetary transmission 6 to the output shaft 11 of the transmission.

Figure 1B:
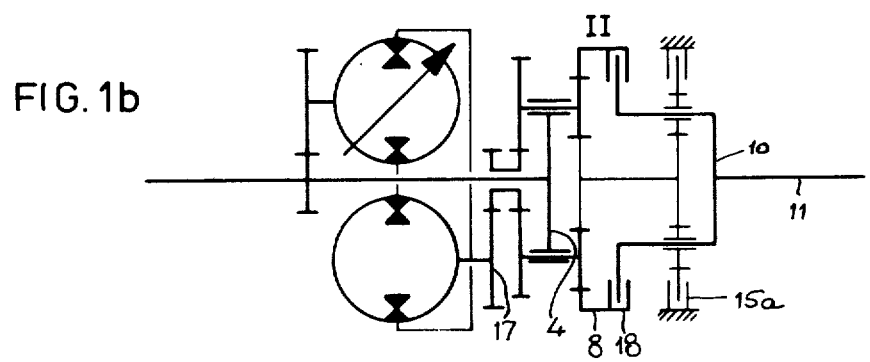
FIG. 1b is a diagram of the power flow for the driving range II.

The mechanical-transmission ratio range II is shown in the same way in FIG. 1b. Here the power flow transmitted to the planet carrier 4 and the gear stage 17 reaches the planet carrier 10 and subsequently the output shaft 11 through the ring gear 8 and the closed clutch 18, the brake 15a being open.

Further embodiments of the transmission described in FIG. 1 are illustrated in FIGS. 2 and 3. For the latter the same reference numerals are used as for the transmission components of FIG. 1 while kinematically equivalent components of the transmission are indicated by equivalent reference numerals in a 100 or 200 series.

In the embodiment represented in FIG. 2, as in FIG. 1, a double planet carrier 104 is used whose shafts planet shafts 120, 121, however, are arranged on different radii. The shaft 120 is arranged on a smaller radius than the shaft 121. The planetary gear 107a rotatable on the shaft 120 is in mesh with the inner central gear 12 and the outer ring gear 108a, while the planet gear 107b on the shaft 121 meshes with the inner central or sun gear 109a and with the ring gear 108b. Ring gears 108a and 108b are coupled in a common member 108 which can be connected by clutch 18 with planet carrier 10.

In the first drive range I, the brake 15a is closed. The drive shaft 3 of the transmission directly drives the carrier 104 of both planets 107a and 107b, and it also drives indirectly, i.e. through the hydrostatic transmission 1, 2 the sun gear 12 of the first planetary set 105. Since the ring gears 108a and 108b are connected together, the transmission of the power output is effected via the double gear 109 and the planet carrier 10 to the output shaft 11 through the planet wheel 6 the clutch 18 being open. In the second driving range II the clutch 18 is closed. The two ring gears 108a and 108b are now directly connected with the planet carrier 10 and thus with the output shaft 11; the speed of the output shaft 11 is thus the same as the speed of the two ring gears 108a and 108b.

FIG. 3 shows a different construction of the first planetary gear stage 205. The sun gear 222 is driven via shaft 212 and the gear stage 17 by the hydrostatic transmission 1, 2. The ring gear 204 is driven via the gear stage 16 by the transmission input shaft 3. The ring gear 204 meshes with the outer planet gear 207 which, in turn, meshes with two inner planetary gears 220 and 221. All three planet gears are arranged on a common carrier 208 although each on a different axis. The plane gear 207 on the axis 208a, the planet gear 220 on the axis 208b and the planet gear 221 on the axis 208c. The inner planet gear 220 meshes with the ring gear 222 and the inner planet gear 221 with the ring gear 223 as is shown in FIGS. 3a and 3b, the gear 223 being connected by a shaft 209 with the sun gear 209' of the second mechanical transmission 6.

In the first driving range I, the brake 15a is closed and the output power of the first planet set 205 is transmitted through shaft 209 to the sun gear 209' of the second planetary set 6. From this inner central gear the output shaft 11 connected to the carrier 10 is driven via the planet wheels 230 of the carrier 10. In the second driving range II, the clutch 18 is closed and the output shaft 11 is driven with the speed of the planet carrier 208.

Figure 4:
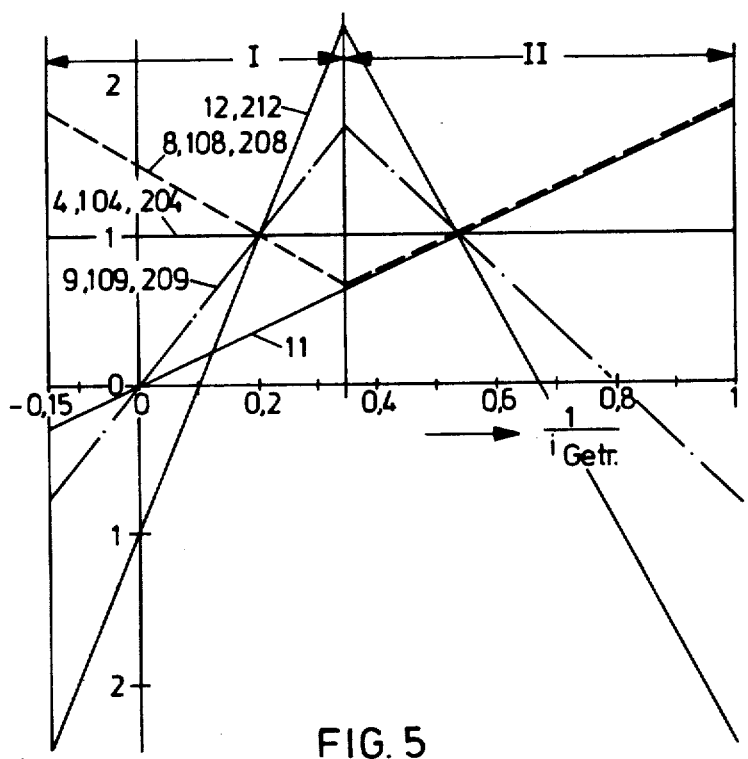
FIG. 4 is a speed graph for the transmission of FIG. 1

In the speed diagram of FIG. 4, the different lines are marked with the reference numbers of the gears and shafts of the transmission according to FIGS. 1, 2 and 3, whose speeds are represented. The planet carrier 4, 104 or ring gear 204, which is connected with the input shaft 3 directly or through gear stages, runs at a speed proportional to the speed of the transmission drive. This speed is superimposed upon the steplessly controllable speed of the sun gear 12, 212. The sum of both speeds 4, 104, 204 at 12, 212 leaves the two-stage first planetary gear transmission 5, 105, 205 according to the switching of the clutches I and II selectively via the ring gear 8, 108 or flange (arms) 208 or via the sun gear 9, 109, 209. In the following second single-stage planetary gear transmission 6, 106, 206, the cumulative speed at the input of sun gear 9, 109, 209 is represented by the ratio i>1 and at the input to the ring gear 8 by i=1. The gear ratios in both planetary gear transmissions are selected to connect synchronously the clutch II during the transition from driving range I to driving range II.

Figure 5:
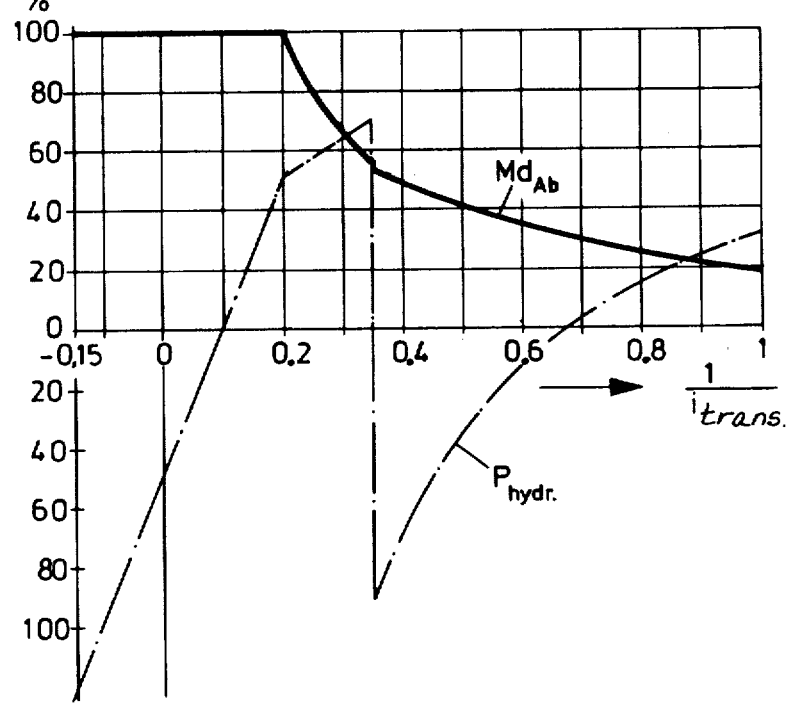
FIG. 5 is a graph of the power and torque characteristics of the transmission according to the embodiments of FIGS. 1, 2 and 3.
Figure 6:
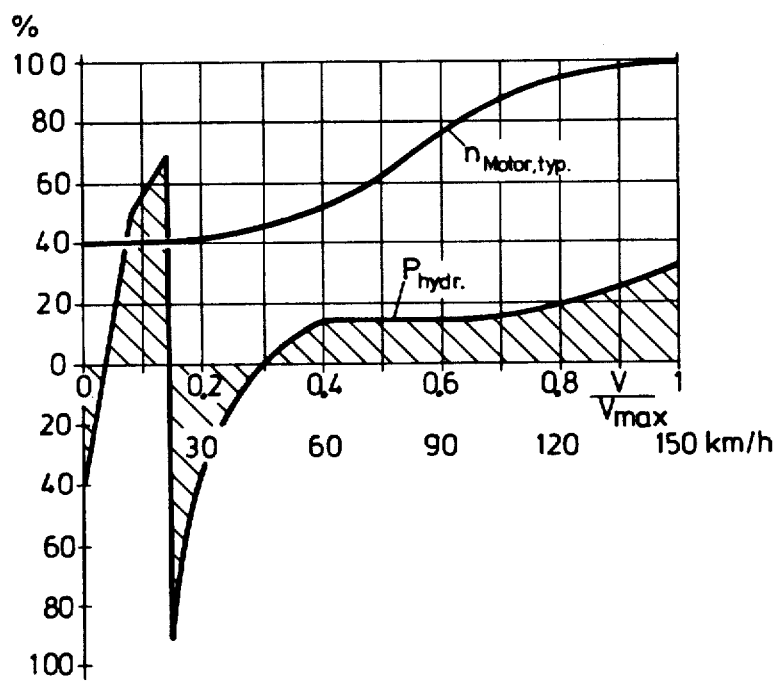
FIG. 6 is a power diagram for a transmission according to the embodiments of FIGS. 1, 2 and 3 with reference to the typical engine speed.

Based upon the speed ratios represented in FIG. 4, certain relationships arise between the hydrostatic and mechanical powers transmitted as is shown in FIGS. 5 and 6.

In FIG. 5 the fraction of the power corresponding to the hydraulic transmission ratio and the transmission output torque are respectively indicated at full load (100% power).

FIG. 6 shows the typical development of the motor speed and the fraction of hydraulic power corresponding to each different speed. It is preferred to use this speed relationship for noise-reducing and (energy) consumption optimization reasons. The hydraulic power fraction is the one which determines the overall efficiency of the transmission.

We claim:

1. A hydrostatic-mechanical transmission system of the power-branching type having a "neutral" operating mode, comprising:
   an input shaft connectable to a prime mover for driving the hydrostatic-mechanical transmission system;
   a hydrostatic transmission including:
      a variable displacement pump having a drive shaft,
      a hydrostatic motor hydraulically connected to said pump and having a motor shaft, and
      means connecting said drive shaft with said input shaft, said hydrostatic transmission having an adjustability from a fully negative value through a zero value to a fully positive value;
   a mechanical transmission including:
      a pair of input elements,
      gearing interconnecting said input elements to provide power summing,
      an output element operatively connected to and driven by said gearing with a power representing the sum of input powers at said input elements,
      speed-range selector means defining a first low-speed range for said gearing and a second high-speed range for said gearing,
      means for continuously and noninterruptedly connecting said input shaft to one of said input elements, and
      means for connecting said motor shaft to the other of said input elements;
   a transmission output shaft connectable to a load to said output element, said hydrostatic transmission having a negative value in said "neutral" mode of the transmission system; and
   means for coupling said transmission such that the transmission ratios of said hydrostatic transmission and said mechanical transmission establish in said neutral mode in each speed range a zero output contribution by mechanical transmission comprising:
      two planetary gear sets in succession, each planetary gear set comprising a sun gear, a ring gear and a planet carrier with a planet gear meshing with said sun gear and said ring gear and constituting three members of the respective planetary gear set, two of said members of a first of said planetary gear sets comprising said input elements, the other member of said first planetary gear set being connectable to one of the members of the second of said sets, another of the members of the second set being connected to one of said two members of said first set, said selector means including means for immobilizing a third member of said second set, whereby said output elements is constituted by a nonimmobilizable member of said second set, and a clutch connecting the planet carrier of said second set with the ring gear of said first set, and a brake for immobilizing the ring gear of said second set.

2. The system defined in claim 1 wherein said means connecting said input shaft to said drive shaft includes a pair of gears, said motor shaft being provided with a further gear meshing with the sun gear of said first set whereby said sun gear of said first set constitutes said other input element, said input shaft being connected with said planet carrier of said first set whereby said planet carrier of said first set constitutes said one input element.

* * * * *